Sept. 26, 1967 M. A. HALL 3,343,386

ANTI-PROBE DEVICE FOR KEY LOCKS

Filed Nov. 15, 1965 3 Sheets-Sheet 1

INVENTOR.
MITCHELL A. HALL
BY
J. Warren Kinney, Jr.
ATTORNEY

ANTI-PROBE DEVICE FOR KEY LOCKS

Filed Nov. 15, 1965 3 Sheets-Sheet 2

INVENTOR.
MITCHELL A. HALL
BY
J. Warren Kinney, Jr.
ATTORNEY

INVENTOR.
MITCHELL A. HALL
BY
J. Warren Kinney, Jr.
ATTORNEY 3,343,386
Patented Sept. 26, 1967

3,343,386

ANTI-PROBE DEVICE FOR KEY LOCKS

Mitchell A. Hall, 445 Rossford Ave.,
Fort Thomas, Ky. 41075

Filed Nov. 15, 1965, Ser. No. 507,867
21 Claims. (Cl. 70—423)

ABSTRACT OF THE DISCLOSURE

The key for manipulating the lock is required to enter the keyhole of the lock by way of a serpentine path in a shield which encases the lock body, with the result that the keyhole and adjacent portions of the lock are rendered inaccessible for punching, probing, or otherwise abusing the lock in an effort to gain unauthorized access to a compartment protected by the lock.

The present invention relates to an anti-probe device for key locks.

An object of the invention is to provide means in association with a lock head, for preventing pilferage of money or other valuables from a vault, lock-box, or like receptacle normally kept in locked condition, and to which access may be gained by use of a proper key.

Another object of the invention is to provide means for the purpose stated, which is applicable to the locks of boxes in current use, as well as those applied to boxes in course of manufacture, the anti-probe device being simple, inexpensive, durable, and effective for preventing unauthorized manipulation of the locks.

A further object of the invention is to so shield the keyhole of a lock, as to prevent success in mistreatment of the lock by unauthorized persons, in aid of rendering the lock ineffective or inoperative.

Another object is to shield the keyhole of a lock in such a manner as to prevent effective manipulation of adjustable skeleton keys therein, in an effort to determine the tumbler action required for unlocking the lock.

The foregoing and other objects are attained by the means described herein and illustrated upon the accompanying drawings, in which.

Figures 1, 2, 3, 4, 5, 6:
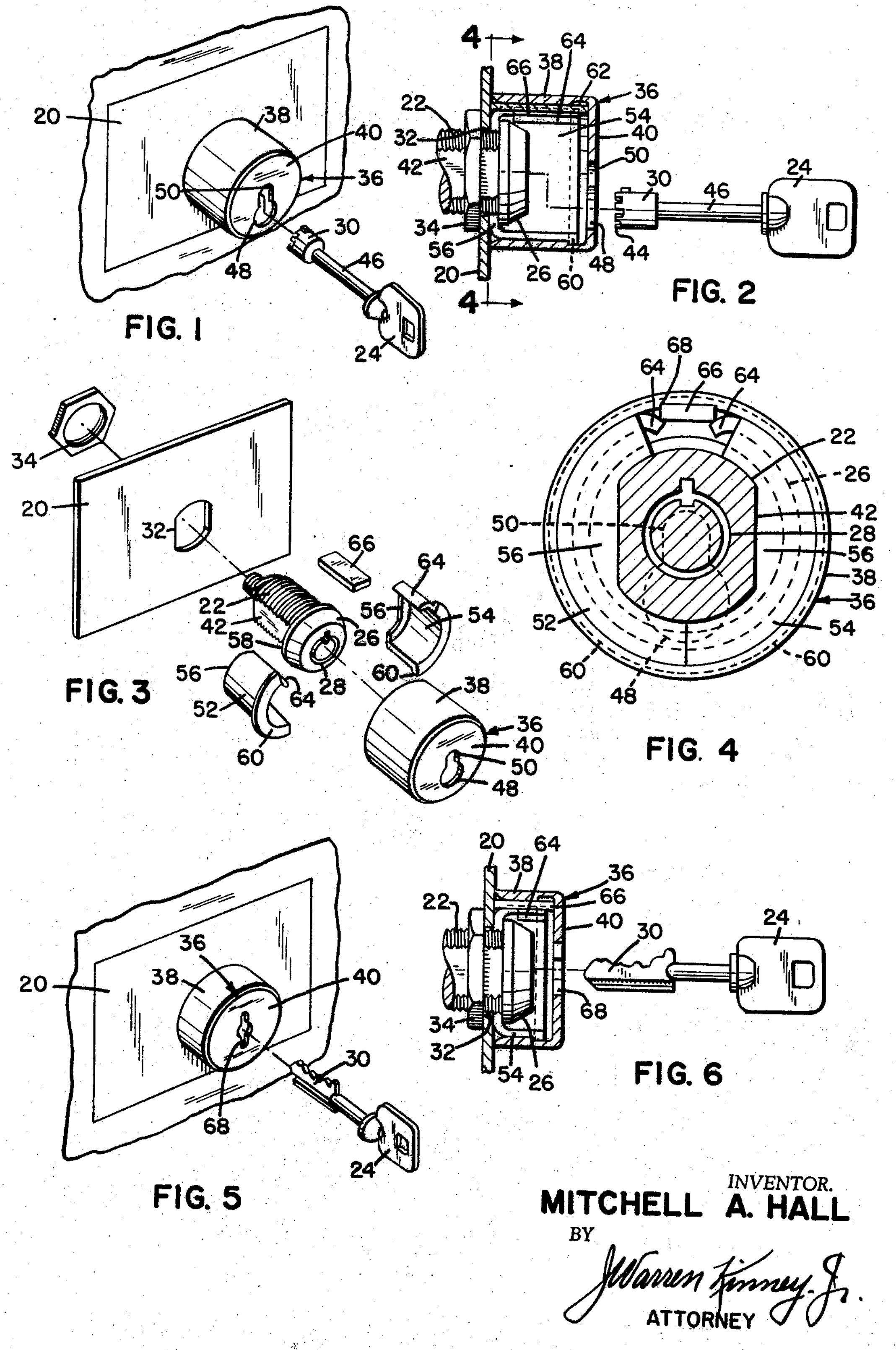
FIG. 1 is a fragmental perspective view of a receptacle closure member and lock embodying the present invention.
FIG. 2 is a vertical cross-section through the FIG. 1 assembly.
FIG. 3 is an exploded perspective view of the same.
FIG. 4 is an enlarged cross-section taken on line 4—4 of FIG. 2.
FIG. 5 is a view similar to FIG. 1, showing a modification.
FIG. 6 is a vertical cross-section through the FIG. 5 assembly.

In all of the drawing views, the reference character 20 indicates the front closure member of a box, drawer, or compartment for the safekeeping of money or other valuables, with a key lock 22 applied thereto and receptive of a proper key 24. The lock in each instance includes a head 26 having a keyhole 28 disposed exteriorly of the front closure member, to receive the tumbler-actuating end 30 of key 24. As is usual, the closure member is provided with an aperture 32 to receive the screw-threaded lock body, and the threads of said body accommodate an interior nut 34 which anchors the lock and holds the lock head 26 firmly against the forward face of closure member 20 marginally of aperture 32.

The reference character 36 denotes a hollow cup-shaped guard or shield having a circumferential skirt 38, and a forward barrier wall 40, this guard or shield being an important element of the present invention.

The closure member 20 and its lock head 26 often are subject to much abuse, particularly when exposed in public places, such as self-service laundries and other establishments utilizing coin-operated machines or devices. To gain access to the coin boxes of such devices or machines, the thief will sometimes punch out the center portion of the lock, or if possible, he may pick the lock using a probe or the like. In other instances, skeleton keys having pins or lugs adjustable to match the lock tumbler settings are employed, such pins or lugs being skillfully adjusted while the actuating end or head of the key engages the keyhole. In still other instances, a key is used carrying a gummy substance which, upon insertion of the key, deposits the substance upon the lock tumblers to freeze them in lock-opening position. Thereafter, access to the coin box is possible without the use of a key.

Such practices as are mentioned above, are effectively prevented or largely discouraged, by outfitting the lock with the means of the present invention.

Referring to FIGS. 1 to 4, the lock head 26 is seen to be larger in diameter than body 22, so that the head abuts the outer face of closure member 20 when body 22 is projected through aperture 32. Both the aperture and the body may be provided with complementary flats as shown, preventing rotation of the lock while held in place by nut 34 threaded onto lock body 22. Flats on body 22 are shown at 42. Rotation of the lock body may be precluded by other appropriate means, if desired.

The cup-shaped shield 36 is adapted to surround and substantially cover the lock head 26, the shield being fixed relative to closure member 20. The forward barrier wall 40 of the shield is spaced from head 26 a distance slightly exceeding the length of key head member 30, which latter is cylindrical and carries suitable detents 44 to actuate the lock tumblers. The shank 46 of the key is of lesser diameter than head member 30.

In the forward barrier wall 40 of the shield is formed a keyhole slot 48–50, one end 48 being dimensioned to nicely receive key head 30, and the other end 50 being constricted in width to nicely receive the shank 46 of the key. The relatively larger open portion 48 of the keyhole slot is offset laterally from the keyhole 28 of the lock, so that key head 30 when inserted through enlarged portion 48, will not register with the keyhole 28 of the lock. Such registration, however may be effected by bodily shifting the key head 30 toward the center line of the lock, to the extent permitted by reduced portion 50 accommodating shank 46 of the key. The reduced portion 50 may be in substantial alignment with the keyhole 28 of the lock, so that portion 50 may limit bodily lateral shifting of key head 30 and serve to align or place head 30 in position to enter the keyhole of the lock as the key is manually advanced axially toward the lock.

From the disclosure of FIG. 2, it is apparent that key head 30 may enter the enlarged portion 48 of the keyhole slot, to strike the lock head 26 at a location beneath the center-line of the lock. However, to align the key with the keyhole of the lock, it is necessary to bodily shift the key head upwardly within shield 36, this being permitted by reason of key shank 46 entering the reduced portion 50 of the slot. Then the key may be advanced longitudinally of its shank, to insert key head 30 into the lock for actuating the lock in normal manner.

The reduced portion 50 of the keyhold slot in shield 36, is smaller in size than the keyhole 28 of the lock, thereby rendering ineffective any probing of the lock tumblers through slot 48, 50. Moreover, the shield wall 40 will prevent manipulation of the detents of an adjustable skeleton key inserted in the lock for fitting the detents to the lock tumblers.

The distance between the forward face of lock head 26 and the inner face of shield wall 40, may closely approximate the length of key head 30, so that the outer ends of the key head detents carrying any gummy substance to jam the lock tumblers, will be wiped clean as the head of the key is shifted across the outer face of the lock head incident to key insertion.

FIG. 3 discloses one form of means for securing shield 36 in position about lock head 26. Such means may comprise a pair of half-round fillers 52, 54 to embrace the lock body behind head 26, the fillers each having an inwardly directed rear flange 56 shaped to closely fit the lock body and its flats 42. Flanges 56 are adapted to be clamped between the forward face of closure member 20 and the circumferential shoulder 58 of the lock head when nut 34 is applied.

The opposite or forward ends of the fillers carry the outwardly extended flanges 60, 60, which may enter an interior annular recess 62 formed within the skirt of shield 36 closely adjacent to wall 40. The flanges 60 snap into annular recess 62 as shield 36 is advanced to home position over the fillers. In-turned edges 64 on the fillers are spaced apart to form a keyway receptive of a short key 66, which latter engages also a recess 68 in skirt 38, to preclude rotation of shield 36 relative to fillers 52 and 54. The fillers may not rotate relative to the lock body, because they are fitted to the flats 42 of the lock body as previously explained.

In the modified structure of FIGS. 5 and 6, shield 36 is non-rotatably fixed over the head 26 of lock 22, utilizing the same means as were described above in the explanation of FIGS. 1 through 4. The structure of FIGS. 5 and 6 is distinguished by the fact that its lock is receptive of a notched flat key head, rather than the cylindrical key head of FIG. 2. Here in FIG. 6, the keyhole slot 68 of shield 36 is shaped in close conformity with the cross-sectional shape of the key head, and is spaced from the lock head 26, to thwart a proper insertion of any adequate punch or effective probe in disabling or picking the lock. In this construction, the keyhold slot of the shield is aligned with the keyhole of the lock, permitting straight line direct insertion of key head 30.

Figures 7, 8:
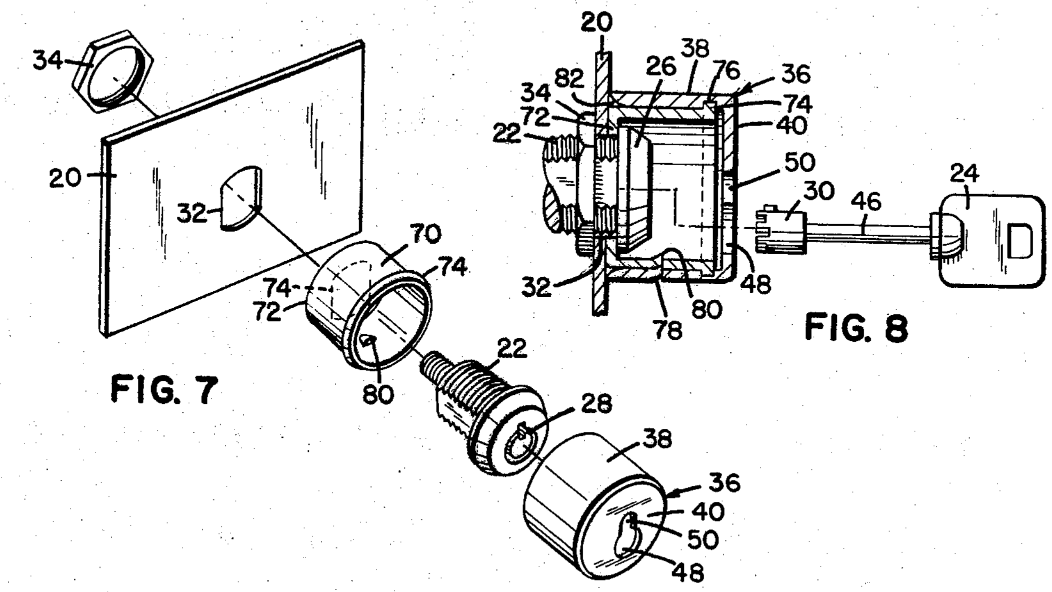
FIG. 7 is an exploded perspective view of a second modification.
FIG. 8 is a vertical cross-section of the FIG. 7 device assembled.

The modification, FIGS. 7 and 8, features the off-set keyhole slot 48, 50 formed in the wall 40 of shield 36, precluding a direct straight-line insertion of the key head 30 into the keyhole of lock 22. In this respect, the structure resembles that of FIGS. 1 to 4. As FIG. 7 clearly indicates, the filler 70 which holds shield 36 in position upon closure member 20, is of one-piece cylindrical construction. Filler 70 includes a rearwall 72 having an aperture 74 to coincide with aperture 32, and adapted to non-rotationally embrace lock body 22. When nut 34 is applied according to FIG. 8, wall 72 is clamped securely between lock head 26 and closure member 20.

At its forward end, filler 70 carries an outwardly directed flange 74 adapted to engage an annular interior recess 76 in the skirt of shield 36, when the shield is forced onto the filler for covering the lock head. This of course presupposes some inherent resiliency in the material of filler 70. To prevent rotation of shield 36 relative to filler 70, the parts may be provided with cooperative interengaging lugs 78 and 80 which register and lock one with the other when shield 36 is driven to home position about the filler, FIG. 8. Application of the shield may be facilitated by chamfering the skirt 38 interiorly, as indicated at 82.

Figures 9, 10, 11, 12:
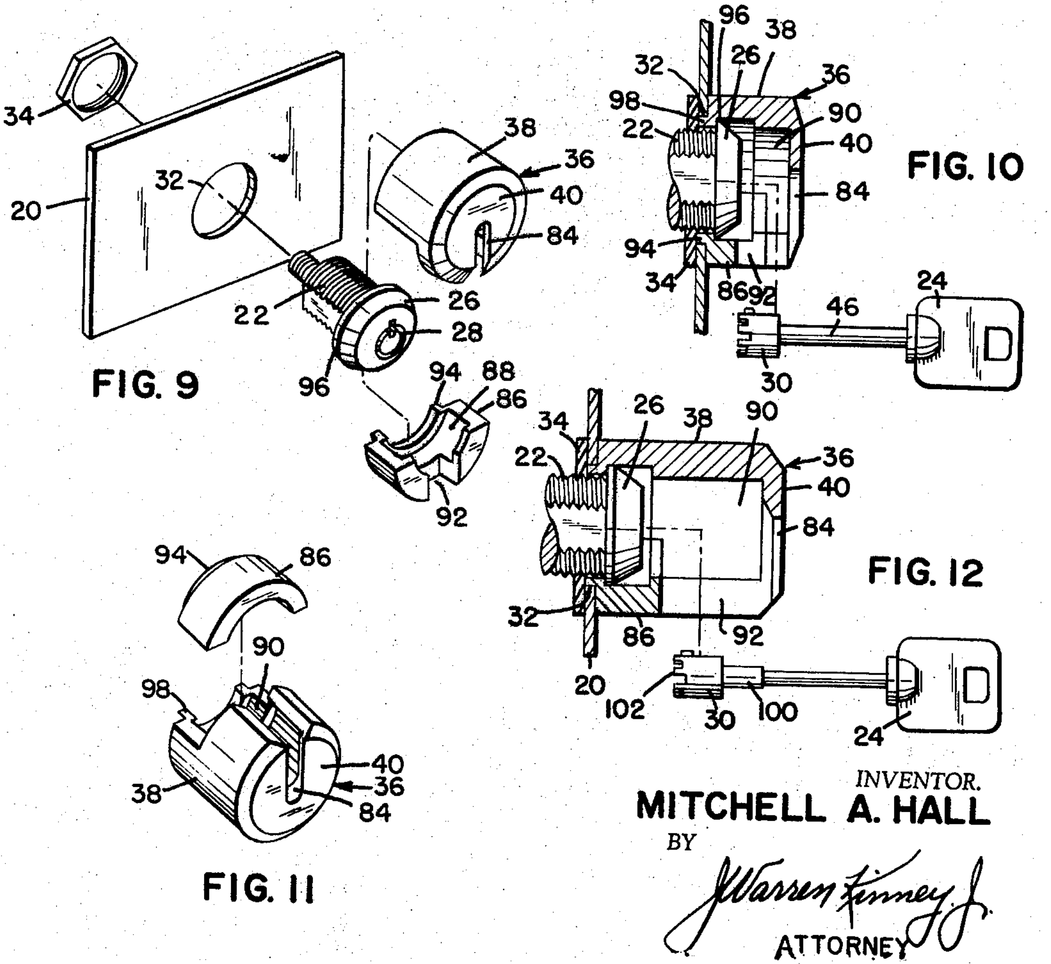
FIG. 9 is an exploded perspective view of a third modification.
FIG. 10 is a vertical cross-section of the FIG. 9 device assembled.
FIG. 11 is a detail view in perspective, showing the lock shield of FIGS. 9 and 10.
FIG. 12 is a vertical cross-section of a fourth modification.

FIGS. 9 and 10 illustrate a modification wherein shield 36 requires no filler, and presents a narrow keyhole slot 84 of uniform width greatly restricting access to the lock head 26. In this construction, the shield is made in two sections 36 and 86. The slot 84 is in section 36, and extends from the approximate center of wall 40 radially outwardly to the peripheral edge of said wall. The slot is slightly wider than the reduced shank 46 of the key, but is much narrower than the diameter of key head 30.

Section 86 is approximately semi-circular, and has a chamber portion 88 to cooperate with the chamber portion 90 of section 36, to accommodate the key head 30. A radial slot 92 extending inwardly of the circumference of section 86, provides a passageway of proper length and width to permit entry of key head 30, FIG. 10, upwardly into the chamber 90 of section 36. When the key head is moved upwardly through the passageway, it can be aligned with and make entry into the keyhole of lock head 26, for actuating the lock.

As FIG. 9 suggests, sections 36 and 86 may be fitted one against the other about lock head 26, to embrace the lock head and provide a cover therefor. Section 86 carries an inwardly directed rear flange 94 for disposition behind the circumferential flange 96 of the lock head, whereas section 36 carries a similar rear flange 98 (FIG. 10), to engage flange 96. The aperture 32 of closure member 20 is enlarged to receive the flanges 94 and 98, and when nut 34 is tightened upon the threads of lock body 22, the flanges aforesaid are secured within aperture 32 with the two-part shield in firm non-rotational abutment upon the forward face of the closure member. The narrow key slot 84 of the shield provides effective protection of the lock against punching, picking, and other unauthorized manipulation.

FIGS. 11 and 12 disclose a structure nearly identical to that of FIGS. 9 and 10, with the exception that chamber 90 and slot 92 are elongated to accommodate the head 30 and accompanying shoulder 100 of a different form of key shown in FIG. 12, this key being one capable of adjustment of its detents 102. Due to the similarity of the structures, FIGS. 9, 10 and FIGS. 11, 12, the same reference characters are applied to these figures. In both instances, the shield slot 84 is constricted as to width, and the key heads are insertable by lateral upward shifting thereof into the shields before the key heads can be aligned with the keyholes of the locks.

Figures 13, 14:
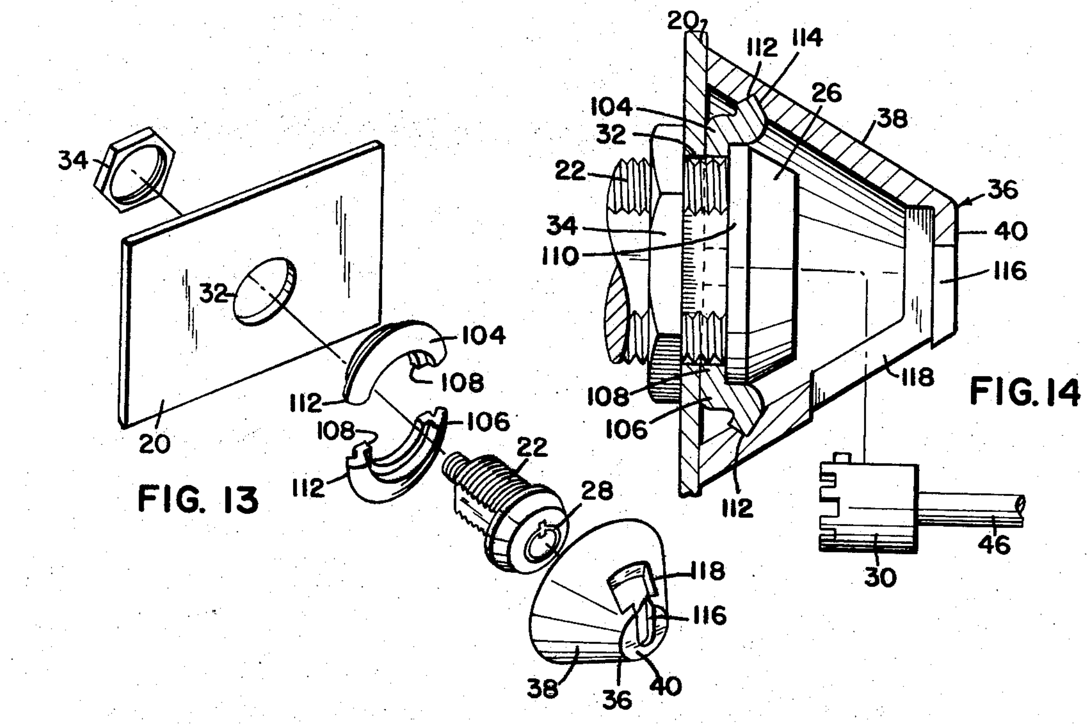
FIG. 13 is an exploded perspective view of a fifth modification.
FIG. 14 is an enlarged cross-section of the FIG. 13 device assembled.

The modification, FIGS. 13 and 14, employs a hollow truncated cone-shaped shield 36, the skirt 38 of which flares outwardly toward closure member 20 to surround the lock head 26, while front wall 40 is reduced in diameter. Shield 36 is of one piece construction, and may be held securely against closure member 20 by means of a bi-part retaining ring 104, 106. The retaining ring includes a rear annular flange 108 to surround the lock body, said flange being clamped between member 20 and the annular shoulder 110 of the lock head when nut 34 is tightened.

The parts 104, 106, may carry an annular outwardly directed lip 112 to engage an annular interior recess 114 of the shield, when the parts are initially assembled about the lock head. As is evident, shield 36 may not be displaced from its covering relationship to the lock head, after nut 34 has been applied and tightened upon the exterior threads of the lock body.

The barrier wall 40 of shield 36 is provided with a narrow radial slot 116 to accomodate the reduced key shank 24 when key head 30 is moved bodily through the opening 118 in the skirt of the shield. The base of keyhole slot 116 preferably determines the location at which the key head will register with the keyhole 28 of the lock, for longitudinal advancement of the key head into the lock. The narrow width of shield slot 116 effectively precludes picking or punching of the lock. If desired, the distance from wall 40 to the forward face of lock 26, may be only slightly greater than the length of key head 30.

Figure 15:
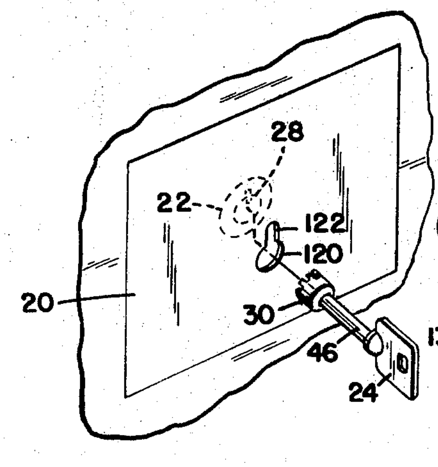
FIG. 15 is a fragmental perspective view of a sixth modification.
Figure 16:
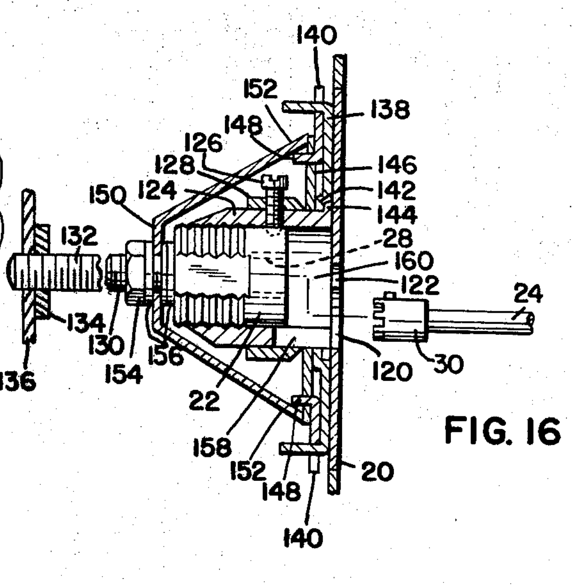
FIG. 16 is an enlarged vertical cross-section of the FIG. 15 device assembled.

In the modification, FIGS. 15 and 16, lock body 22 is located wholly behind the plane of closure member 20, and the closure member itself is provided with a keyhole slot 120, 122, which slot is offset relative to the keyhole 28 of the lock. As shown in FIGS. 15, the keyhole slot of the closure member has an enlarged circular portion 120 to receive the head 30 of a key, and a connecting narrow elongate portion 122 to accommodate the key shank. In order to insert the key head into the lock, it is necessary that the key head be inserted into the offset circular portion 120, followed by lateral shifting of the key shank into portion 122 of the slot, which aligns the key head with the lock keyhole 28 for entry therein.

Lock body 22 is supported within the sleeve-like stationary lock receptacle 124, and may be fixed therein by means of a set screw 126 carried by a retaining collar 128 which surrounds the lock receptacle. The shaft 130 of the lock is infinitely rotatable by means of key 24, and an extension 132 of the lock shaft is externally threaded to enter a nut 134 fixed to the rear wall 136 of a vault closed at its front by closure member 20. Rotating the shaft 130, 132 in one direction by means of key 24, unscrews the shaft from nut 134 and wall 136, to release the closure member assembly for bodily displacement from the vault front, thereby affording access to the vault. Rotation of the screw in the opposite direction restores the connection at nut 134, to fix the closure member in closing position relative to the vault.

In an alternative construction, closure member 20 may carry a fixed inner guide plate 138 for guiding the extendable and retractable bolts 140. The bolts may engage keepers associated with the walls of the vault located near the closure member, in accordance with common practice, to lock the vault. A central annular flange 142 on plate 138 may engage a peripheral flange 144 of lock receptacle 124 to fix the lock receptacle against the rear face of closure member 20.

A bolt actuating cam disc 146 is adapted, upon limited rotation in opposite directions about member 124, to slidingly extend and retract the bolts 140. For the purpose, cam disc 146 is provided with eccentric cam slots (not shown), in which ride the bolt extensions 148. This construction is well known in the art, and need not therefore be detailed herein. Limited rotation of cam disc 146 may be effected by means of a cam bracket 150, whose arms 152 have a driving connection with the cam disc. By means of a nut 154 and washers 156 on shaft 130, cam bracket 150 may be rotated with shaft 130, by means of key 24, for extending and retracting the bolts 140.

The tubular lock receptacle 124 may be longitudinally end-slotted at 158 directly behind the circular portion 120 of the keyhole slot formed in closure member 20, to permit insertion of key head 30 into the chamber 160 between lock body 22 and the inner face of closure member 20. The lock receptacle 124 and retaining collar 128, together with the offset keyhole slot 120, 122, constitute the anti-probe structure whereby the lock is protected against punching and probing in the attempt to gain unauthorized access to the vault.

As in other structures hereinbefore described, lock 22 may be actuated only by inserting the key head into the circular portion of keyhole slot 120, followed by bodily shifting of the key laterally until the key shank strikes the base of narrow slot portion 122, in which position of the key its head 30 is aligned with the keyhole of lock 22. The key may then be shifted longitudinally toward and into the lock for proper manipulation of bolts 140 as previously explained. The space between the inner face of closure member 20 and the adjacent face of lock 22, shall be slightly greater than the length of key head 30.

It should be understood in connection with FIG. 16, that fixation of closure member 20, in practice, will employ either but not both of the securing devices 140 or 134. That is, use of the bolts 140 for securing the closure member upon the vault renders unnecessary the fastening means at 134. On the other hand, the bolt structure at 140 would be omitted if the means 132, 134 is selected to secure the closure member within or upon the access opening of the vault.

In accordance with the invention disclosed, the key for manipulating the lock must enter the keyhole of the lock by way of a serpentine path, with the result that the vulnerable portion of the lock is rendered inaccessible for punching, probing, and otherwise abusing the lock in an effort to gain unauthorized access to a compartment protected by the lock.

It is to be understood that various modifications and changes in the structural details of the device may be made, within the scope of the appended claims, without departing from the spirit of the invention.

What is claimed is:

1. A protective device for a key actuated lock having a lock body, and a head portion including a keyhole for receiving a shank and an adjacent actuating head of a key whose head is larger than the shank thereof, said device comprising a hollow shield member for substantially covering the head portion of the lock, said shield member having a forward wall apertured for receiving a portion of a key, said forward wall and aperture being spaced from the head portion and the keyhole therein to provide a chamber intermediate said forward wall and said head portion, to interfere with unauthorized probing of the lock through the keyhole thereof, the aperture of the forward wall of the shield comprising an enlarged portion larger than the shank and the actuating head of the key, and a narrow connecting slot projecting from said enlarged portion, said slot being larger than the key shank, smaller than the actuating head of the key, and smaller than the keyhole of the lock, whereby said narrow slot blocks a portion of the lock keyhole; the enlarged portion of the shield aperture being offset as to alignment relative to the keyhole of the lock, and a portion of the narrow connecting slot being in alignment with said lock keyhole, whereby alignment of the key head for insertion thereof into the keyhole of the lock necessitates an initial insertion of the key head through the enlarged portion of the shield aperture, followed by a lateral bodily shifting of the key for placing the shank thereof within the narrow connecting slot of the shield aperture and in alignment with the keyhole of the lock; and means fixing the shield member relative to the keyhole of the lock, to prevent unauthorized access to said keyhole.

2. The device as specified in claim 1, wherein the shield is of hollow cup shape and includes a skirt to surround the lock head in substantial concentricity therewith.

3. The device as specified in claim 1, wherein the chamber space between the head portion of the lock and the forward wall of the shield, slightly exceeds the length dimension of the actuating head of the key.

4. In combination, a closure member for a vault, and a key actuated lock including means for securing the closure member in position for precluding access to the vault, said lock having a body and a head portion including a keyhole for receiving a shank and an adjacent actuating head of a key whose head is larger than the shank thereof, means securing the lock body to the closure member with the keyhole thereof disposed at one face of the closure member, a hollow shield member including a wall substantially covering the head portion and the keyhole of the lock, and means securing the shield member in fixed relation to the closure member, said shield member wall having an aperture therein spaced from the head portion of the lock, the aperture being receptive of the key and comprising an enlarged portion larger than the shank and the actuating head of the key, and a narrow connecting slot projecting from said enlarged portion, said slot being larger than the key shank, smaller than the actuating head of the key, and smaller than the keyhole of the lock, whereby said narrow slot blocks a portion of the lock keyhole; the enlarged portion aforesaid being offset as to alignment relative to the keyhole of the lock, and a portion of the narrow connecting slot being in substantial alignment with said lock keyhole, whereby alignment of the key head for insertion thereof into said keyhole necessitates an initial insertion of the key head through the enlarged portion of the shield member wall aperture, followed by a lateral bodily shifting of the key for placing the shank thereof within the narrow connecting slot, with the actuating head in alignment with the keyhole of the lock.

5. The combination as specified in claim 4, wherein said shield member provides a chamber between the shield member and the head portion of the lock, dimensioned to slightly exceed the length of the actuating head of the key, and within which chamber said key head is shiftable laterally to alignment with the keyhole of the lock.

6. The combination as specified in claim 4, wherein the securing means for the shield member includes a filler member fixed relative to the closure member, and cooperative means on the filller member and the shield member for precluding axial and rotational shifting of the shield member relative to the fixed filler member.

7. In combination, an apertured vault closure plate, and a protective device for a key actuated lock having a lock body, and a head portion including a keyhole for receiving a shank and an adjacent actuating head of a key whose head is larger than the shank thereof, said device comprising a hollow shield member fixed relative to the lock body and to said closure plate for substantially covering the head portion of the lock, said shield member comprising a forward wall and a circumferential skirt defining said wall, an aperture in the skirt receptive of the key head, and an elongated narrow slot in the forward wall receptive of the shank of the key, said slot having one end communicating with said aperture, and an opposite end terminating in the forward wall of the shield in substantial alignment with the keyhole of the lock, said forward wall and slot being spaced from the head portion of the lock a distance slightly in excess of the length of the key head, the key being alignable with and insertable into the keyhole of the lock incident to passage of the key head through the skirt aperture, while the shank of the key enters the slot of the forward wall to align with the lock keyhole; said slot being smaller than the key head, and larger than the key shank, and smaller than the keyhole of the lock whereby the slot blocks a portion of said keyhole of the lock; said skirt aperture being larger than the key head and the shank, to receive both said key head and said shank whereas the narrow slot blocks withdrawal of the key head axially of the keyhole.

8. The device as specified in claim 7, wherein the skirt of the shield surrounds the head portion of the lock.

9. The device as specified in claim 8, wherein is included a filler engaging the skirt and the head portion of the lock and means fixedly securing the filler upon a face of the vault closure plate.

10. The device as specified in claim 9, wherein the filler is of bi-part construction, with the parts assembled about and embracing the lock body in close proximity to the head portion of the lock.

11. In combination, a closure member for a vault opening; movable means for selectively fixing and releasing the closure member with respect to said vault opening, the closure member having an outer face and an inner face; a key actuated lock having a forward end including a keyhole for reception of an elongate actuating head disposed at one end of a key shank, the shank being smaller in size than the actuating head; operating means on the lock driven by the actuating head of the key, for actuating the aforesaid movable means of the closure member; means on the closure member for supporting the lock with its forward end spaced from the inner face of the closure member at a distance in excess of the length of the actuating head of the key; and a keyhole aperture in the closure member, said aperture having an enlarged portion out of alignment with the keyhole of the lock, and dimensioned to receive and pass the actuating head and the reduced shank of the key, said aperture having a narrow slot portion smaller than the key head and larger than the key shank, said narrow slot portion extending from said enlarged portion to receive the shank of the key, said slot having a terminal end portion in alignment with the keyhole of the lock, whereby disposition of the key shank in the terminal end portion of the slot poises the actuating head of the key for alignment with and entry into the keyhole of the lock.

12. The combination as specified in claim 11, wherein the movable means for fixing and releasing the closure member includes a shiftable bolt to engage and disengage a keeper at the vault opening, and the operating means of the lock includes a rotatable shaft on the lock rockable axially by the key when inserted in the keyhole of the lock, and means for translating movements of said shaft to the shiftable bolt aforesaid.

13. The combination as specified in claim 12, wherein the means for supporting the lock includes a cylindrical sleeve-like receptacle having a circumferential outwardly extended flange at one end thereof, and means for fixing the lock within the receptacle against relative rotation; a guide plate fixed upon the inner face of the closure member, including means to guide the bolt when shifted; and means on the guide plate to engage the outwardly extended flange of the lock receptacle, for fixing said receptacle against axial and rotational movement relative to the closure member.

14. The combination as specified in claim 11, wherein the operating means of the lock includes a rotatable shaft subject to rotation in opposite directions by the key after insertion of the actuating head of the key into the keyhole of the lock, said shaft having a screw-threaded free end remote from the lock, and a fixed nut aligned with said shaft interiorly of the vault, to be engaged and disengaged by the threaded end of the shaft upon rotation thereof in opposite directions, said shaft and said nut constituting the movable means for selectively fixing and releasing the closure member with respect to the vault opening.

15. The combination as specified in claim 14, wherein the means for supporting the lock includes a cylindrical sleeve-like receptacle having a circumferential outwardly extended flange at one end thereof, and means for fixing the lock within the receptacle against relative rotation; a plate fixed upon the inner face of the closure member; and means on said plate to engage the outwardly extended flange of the lock receptacle, for fixing said receptacle against aixal and rotational movement relative to the closure member.

16. A key actuated lock construction for application to an apertured plate-like closure member, and comprising in combination: a lock having an elongate substantially cylindrical body receptive in the closure member aperture; a head on said body including a circumferential shoulder larger in diameter than said aperture, the head having a keyhole therein extending lengthwise of the lock body and adapted for accommodating a key; a cup-shaped shield having a skirt, and an apertured forward wall to cover the lock head, said skirt being open at one end to receive and surround the lock head, with the open end of the skirt abutting one face of the closure member marginally of the closure member aperture, said skirt having an interior recess therein adjacent to the apertured forward wall thereof; a pair of arcuate elongate filler members fitted about the lock body, and each including a radially projected forward flange near an end thereof for reception in the interior recess of the skirt, said filler members each including an inwardly directed rear flange to abut said one face of the closure member and the shoulder of the lock head; means for expanding the filler members to maintain the forward flanges locked within the interior recess of the skirt; and means securing the lock body within the closure member aperture, with the rear flanges of the filler members clamped between the shoulder of the lock head and said one face of the closure member; said key accommodated by the keyhole of the lock being constituted of an elongate shank having an enlarged head located upon one end of the shank, said key head being receivable in the keyhole to effect actuation of the lock; the aperture of the forward wall of the shield comprising an enlarged portion larger than the shank and the actuating head of the key, and a narrow connecting slot extending from said enlarged portion, said slot being larger than the key shank, smaller than the actuating head of the key, and smaller than the keyhole of the lock, whereby said narrow slot blocks a portion of said keyhole; the enlarged portion of the shield aperture being offset as to alignment with the keyhole of the lock, and a portion of the narrow connecting slot being in substantial alignment with said keyhole.

17. The lock construction as specified by claim 16, wherein the apertured forward wall of the shield is spaced from the keyhole of the lock head a distance greater than the length of the actuating head of the key.

18. A lock construction for application to an apertured plate-like closure member, and actuatable by a key comprising an elongate shank having an enlarged head located at one end of the shank, said construction comprising: a lock having an elongate substantially cylindrical body receptive in the closure member aperture; a head on said lock body including a circumferential shoulder larger in diameter than said aperture, the head having a keyhole therein extending lengthwise of the body and adapted to accommodate a key actuating head; a cup-shaped shield having a skirt, and an apertured forward wall to cover the lock head, said skirt being open at one end to receive and surround the lock head, with the open end of the skirt abutting one face of the closure member marginally of the closure member aperture; an elongate cylindrical open-ended filler member fitted snugly within the skirt of the shield axially thereof, said filler member having at one end an inwardly directed flange to surround the lock body and abut the shoulder of the lock body head; means securing the lock body within the closure member aperture, with the flange of the filler member clamped between the shoulder of the lock head and said one face of the closure member; and means for securing the shield against rotation relative to the filler member; the aperture of the forward wall of the shield comprising an enlarged portion larger than the shank and the actuating head of the key, and a narrow connecting slot extending from said enlarged portion, said slot being larger than the key shank, smaller than the actuating head of the key, and smaller than the keyhole of the lock, whereby said narrow slot blocks a portion of said keyhole; the enlarged portion of the shield aperture being offset as to alignment with the keyhole of the lock, and a portion of the narrow connecting slot being in substantial alignment with said keyhole.

19. The lock construction as specified by claim 18, wherein the apertured forward wall of the shield is spaced from the keyhole of the lock a distance greater than the length of the actuating head of the key.

20. A lock construction for application to an apertured plate-like closure member, and actuatable by a key comprising an elongate shank having an enlarged head located at one end of the shank, said construction comprising: a lock having an elongate substantially cylindrical body receptive in the closure member aperture; a head on said lock body including a circumferential shoulder larger in diameter than said aperture, the head having a keyhole therein extending lengthwise of the body and adapted to accommodate a key actuating head; a cup-shaped shield having an apertured skirt and an apertured forward wall to cover the lock head, said skirt being open at one end to receive and surround the lock head, with the open end of the skirt abutting one face of the closure member marginally of the closure member aperture; means adjacent to the open end of the skirt forming an interior abutment for engaging the shoulder of the lock head marginally thereof; and clamp means on the lock body for fixedly clamping the lock head shoulder against the interior abutment of the skirt, and the open end of the skirt against said one face of the closure member, to preclude relative movement between said lock head, said skirt, and said closure member; the aperture of the skirt being adjacent to the forward wall thereof, and being larger than the shank and the actuating head of the key, and the aperture of the forward wall of the shield being in the form of a narrow slot in communication with the aperture of the skirt, said slot being larger than the key shank, smaller than the actuating head of the key, and smaller than the keyhole of the lock, whereby said narrow slot blocks a portion of said keyhole, a portion of said slot being in substantial alignment with said keyhole.

21. The lock construction as specified by claim 20, wherein the apertured forward wall of the shield is spaced from the keyhole of the lock a distance greater than the length of the actuating head of the key.

References Cited

UNITED STATES PATENTS

| | | | |
|---|---|---|---|
| 450,340 | 4/1891 | Russell | 70—406 |
| 676,450 | 6/1901 | Schwartz | 70—454 X |
| 954,856 | 4/1910 | Dembinaki | 70—423 X |
| 1,139,218 | 5/1915 | Olm | 70—423 |
| 1,195,808 | 8/1916 | Grgich | 70—423 |
| 1,363,599 | 12/1920 | Hull et al. | 70—404 X |
| 1,408,477 | 3/1922 | Schonwald | 70—370 |
| 1,966,171 | 7/1934 | Holtzman | 70—427 |
| 2,877,637 | 3/1959 | Greenwald | 70—86 |
| 3,065,623 | 11/1962 | Regan | 70—86 X |
| 3,212,308 | 10/1965 | Eads | 70—370 X |

MARVIN A. CHAMPION, *Primary Examiner.*

P. TEITELBAUM, *Assistant Examiner.*